Sept. 3, 1946.  A. E. THOMPSON ET AL  2,406,865
MEANS FOR PREPARING FACSIMILE MESSAGES FOR TRANSMISSION
Filed May 18, 1942  5 Sheets-Sheet 1

Sept. 3, 1946.    A. E. THOMPSON ET AL    2,406,865
MEANS FOR PREPARING FACSIMILE MESSAGES FOR TRANSMISSION
Filed May 18, 1942    5 Sheets-Sheet 2

INVENTORS
A. E. Thompson
R. B. Salmon
BY
R. P. Morris
ATTORNEY

Sept. 3, 1946. A. E. THOMPSON ET AL 2,406,865
MEANS FOR PREPARING FACSIMILE MESSAGES FOR TRANSMISSION
Filed May 18, 1942 5 Sheets-Sheet 4

INVENTORS
A. E. Thompson
R. T. Salmon
BY
ATTORNEY

Sept. 3, 1946.    A. E. THOMPSON ET AL    2,406,865
MEANS FOR PREPARING FACSIMILE MESSAGES FOR TRANSMISSION
Filed May 18, 1942    5 Sheets-Sheet 5

INVENTORS
A. E. Thompson
R. E. Salmon
R. P. Morris
BY
ATTORNEY

Patented Sept. 3, 1946

2,406,865

UNITED STATES PATENT OFFICE 2,406,865

MEANS FOR PREPARING FACSIMILE MESSAGES FOR TRANSMISSION

Alfred Edward Thompson and Reginald Dennis Salmon, Croydon, England, assignors to Creed and Company Limited, Croydon, England, a British company Application May 18, 1942, Serial No. 443,441
In Great Britain April 18, 1941

15 Claims. (Cl. 178—5)

This invention relates to means for preparing facsimile messages for transmission. Facsimile transmission systems in which the material to be transmitted is placed upon a tape are particularly suitable for use in mobile services, such as transmission from an aeroplane or other moving vehicle, as a transmitter of this character can be made of compact, light weight design. It is, however, important that the message prepared on the tape should be perfectly legible and that the tape can be quickly prepared.

Tape prepared by a typewriter provides for the maximum possible transmitting speed and avoids difficulties due to illegibility caused by bad handwriting, but it has hitherto suffered from three serious disadvantages.

1. The typewriter mechanism employed in a standard typewriter is relatively complex and expensive.
2. A very fine scanning system must be employed with characters of the dimensions produced by means of a standard typewriter.
3. Delay is introduced between the moment of printing on a standard typewriter and the moment of transmission of the message.

It is, therefore, an object of this invention to provide typewriting means for the preparation of subject matter for transmission in a tape facsimile system that shall be convenient in use, that will reduce the time between the preparation and the transmission of a message to a minimum, and will impart to the subject matter characteristics that will facilitate the scanning and transmission operations. It may readily be understood that, if the characters are formed of relatively thin lines, it is necessary to employ a scanning system of correspondingly fine dimensions. There is a fixed relationship between the number of lines per inch in the scanning mesh and the speed of transmission in words per minute for given sized characters and for a given frequency band width in the channel of communication. In order to obtain the maximum speed in words per minute, it is, therefore, necessary to employ a scanning mesh as coarse as possible. Hence, it is advantageous to arrange the thickness of the lines forming the characters to be as great as possible, consistent with legibility, i. e., the thickness of the lines should be equivalent to a large fraction of the normal height of the characters. It has been found that an advantageous relationship is provided if this ratio is as one is to five.

If these proportions are maintained, the actual size of the characters is limited, in one direction by the signal-to-noise ratio of the photo-electric amplifier used in the scanning system, and, in the other direction, only by the dimensions of the paper required on which to carry the message.

The requirements of the photo-electric amplifier are such that it is inconvenient to use a scanning element that is smaller in diameter than approximately .020″. It is, therefore, desirable that the thickness of the lines in the character should be not less than .030″. With lines of this minimum thickness, the letters "M" and "W" must be not less than 5/32″ wide and preferably more. This is about 50 per cent wider than is required for any other character.

This invention provides simple and inexpensive typewriting means whereby characters of the kind required may be printed rapidly and conveniently.

The invention also provides means for this purpose which do not require skill such as required for the operation of a standard typewriter key-board.

The invention also provides means whereby the amount of feeding motion imparted to the paper may be varied in accordance with the width of the character recorded.

Means is provided whereby the tape, without being broken, may be fed with an intermittent motion past the printing position and, with a continuous motion, past the transmitting position, the arrangement being such that a loop of tape is normally formed between the two feeding positions. In the event of the loop being absorbed so that the tape becomes taut, the continuous feeding action will overcome the intermittent feeding action and the continuous motion of the tape past the transmitting point will not be interrupted.

It has further been found that, where the vertical lines of the characters to be transmitted are of the same width as the horizontal lines, it is more difficult to ensure that the vertical lines are correctly reproduced.

Means is provided, therefore, whereby the vertical lines may be made thicker than the horizontal lines.

The typewheel may be brought to the printing position under the direct control of a manually-operated member, which may be moved into one or other of a number of positions corresponding to the number of printing positions on the typewheel.

The typewheel may be moved endways into one or other of two positions, under the direct control of two shift keys.

The typewheel is mounted below the paper tape, upon which the message is to be printed, an inked ribbon is above the tape, and a printing hammer above the inked ribbon.

The inked ribbon may be in the form of a continuous band, which may be recharged with ink from an ink-charged roller.

The invention will now be described with reference to the accompanying drawings, in which.

Figure 1:
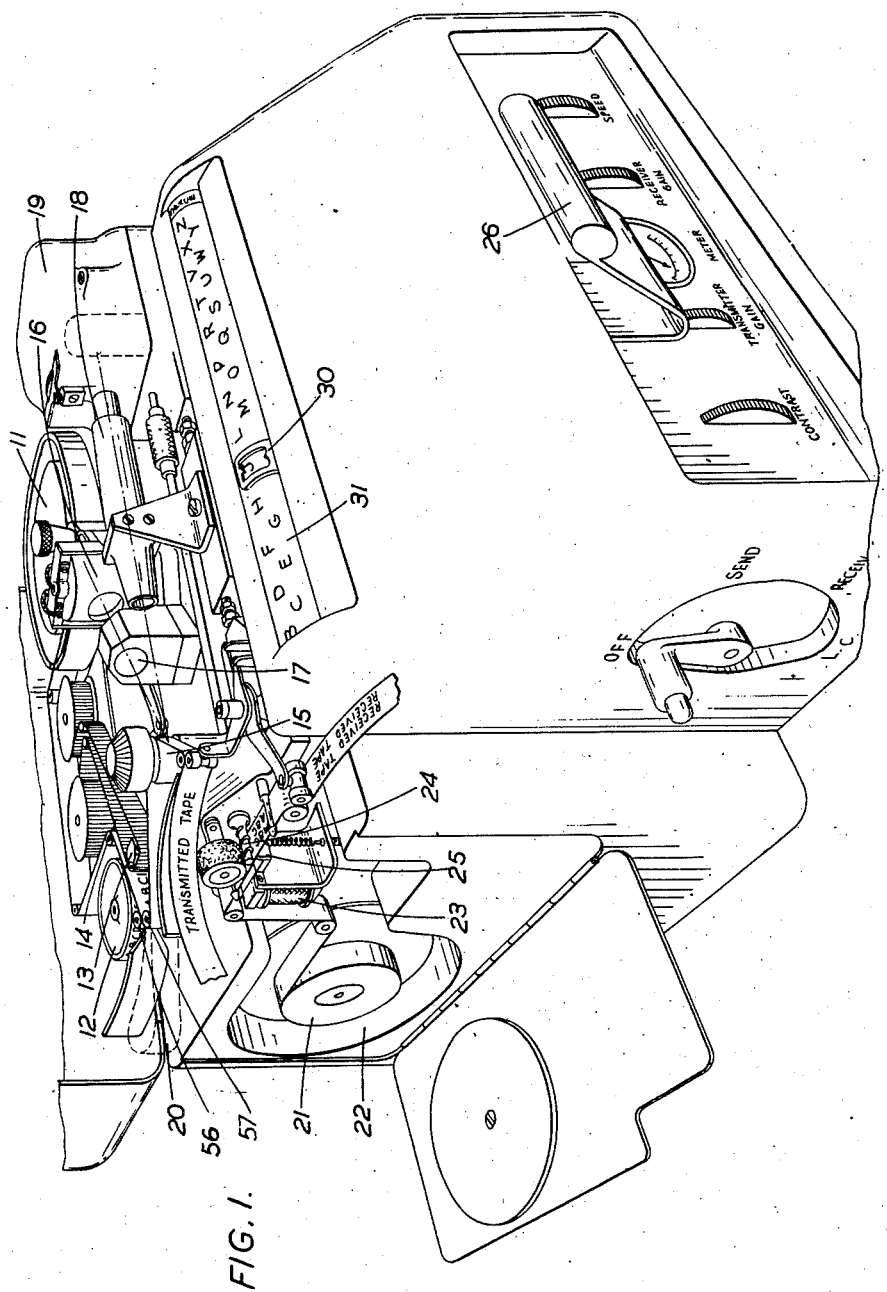
Figure 1 shows in perspective a complete and unitary equipment for facsimile tape telegraphy, this equipment comprising a transmitter, a receiver, and a typewriter for typing the message to be sent in the form most suitable for transmission by facsimile telegraphy.

Referring to Figure 1 the whole equipment both mechanical and electrical is incorporated in a single casing, and comprises a telegraph transmitter, telegraph receiver, and a typewriter for use with the transmitter.

The transmitting tape is led off from its spool 11 and taken round in front of the type-wheel 12 where it can be marked, as will be described, by a type-wheel hammer 13 around which passes an inked ribbon 14. After being marked the tape is taken into a scanning position on the surface of a post 15 where it is scanned by an optical system comprising a lamp 16, lenses 17 and 18, and a photo-electric cell 19. The motion of the transmitting tape past the type-wheel is an intermittent one determined by the typing operation, but its movement at the scanning position is continuous. Usually these two different movements will be provided for by a loop 20 in the tape; but means is provided, as will be described, for the continuous motion to over-ride the intermittent motion if all the slack 20 should be taken up.

The reel of tape 21, upon which the incoming message has to be recorded is led from its spool chamber 22 at the left-hand end of the machine over guide rolls to a printing position where a receiving magnet 23 is operated or not operated according as the incoming signals indicate. An inked helix 24 is in continuous rotation, and an operation of the magnet 23 causes a knife edge 25 which is disposed below the tape and parallel with the axis of the helix to press the tape against the inked surface of the helix and thus cause a mark to be made. The co-operating helix and knife thus constitute a widthwise scanning system operable in consonance with a photo-electric scanning mechanism on the transmitter.

The typing on the transmitting tape is effected by means of a handle 26 at the front of the equipment which can be moved to and fro horizontally to select a certain character and then in any such horizontal position can be pressed downwardly to cause printing of the character that has been selected.

Figure 2:
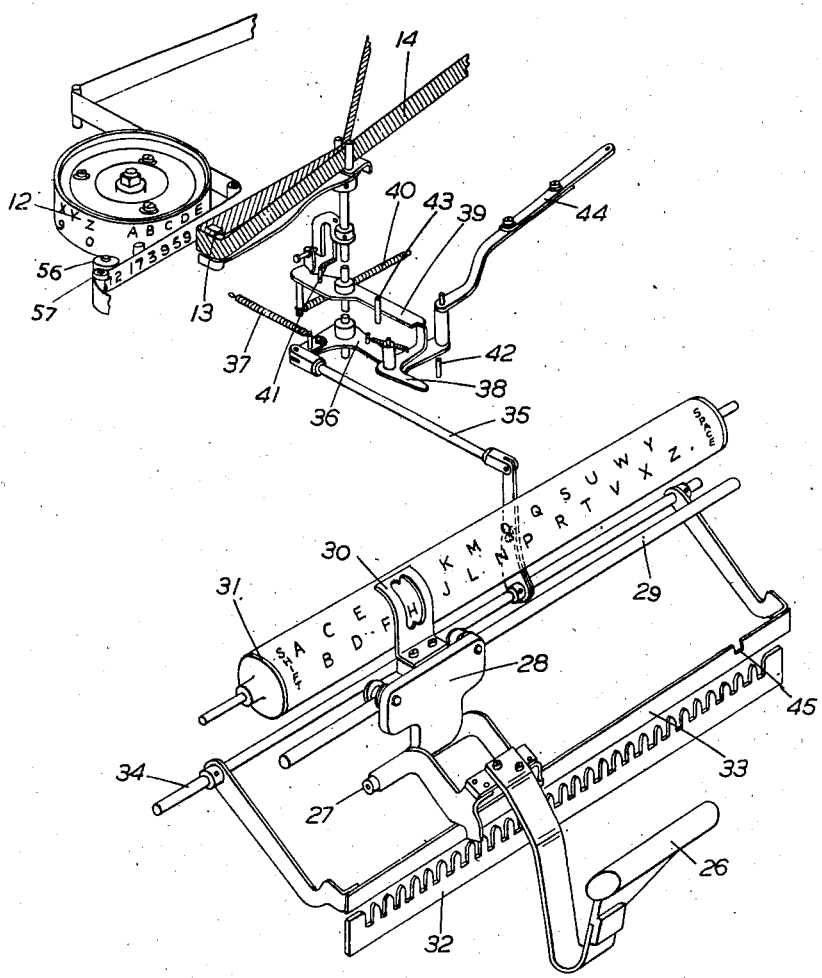
Figure 2 shows in perspective that part of the mechanism pertaining to the operation of the hammer in the typing of the message.

This part of the invention will be best understood by reference to the detailed figures which have been drawn to illustrate particular parts of the mechanism, and reference will now be made to Figure 2 showing how the typing is performed. The handle 26 is pivoted at 27 to a carriage 28 which can be run in both directions along the fixed horizontal guide rail 29. This horizontal movement causes rotation of the type-wheel 12 in a manner that will be described later. The particular character which is chosen by such horizontal positioning is indicated by the position of the cursor 30 on the surface of the drum 31. A fixed comb 32 engageable when the handle 26 is depressed ensures that no character is struck unless or until it has been positioned accurately with respect to the tape and hammer. When the handle 26 is depressed sharply it engages a bail 33 to cause a horizontal shaft 34 to be rotated in the clockwise direction and thus through a link 35 cause an anti-clockwise movement of a bellcrank 36 against the action of its return spring 37. The other arm of the bellcrank 36 carries the pivot pin for a second bellcrank 38 which is normally in engagement with a lever 39 urged clockwise by the tension spring 40. The lever 39 is coupled through a tension spring 41 with a part which is rigidly associated with the hammer 13. Thus the counter-clockwise movement of the bellcrank 36 already mentioned causes a similar counter-clockwise rotation of both the lever 39 and the hammer itself. These movements continue until the secondary bellcrank 38 meets a fixed stop 42 which prevents its further movement in unison with the bellcrank 36 causing it now to perform the rotation clockwise about its own pivot pin. This movement disconnects it from the lever 39 and the latter is thus freed and flies back under the tension of its spring 40 until it meets its back stop 43. The hammer 13 also participates in this movement but without being limited in its travel by the back stop. Thus the hammer flies onward and strikes the typewheel, being finally retracted by means of the spring 41. As the inked ribbon 14 passes round the typewheel it causes the transmission tape to be marked in accordance with the delineation on the periphery of the typewheel 12. The link 44 connected to the bellcrank 36 leads to a known mechanism for feeding the inked ribbon step-by-step.

Figure 3:
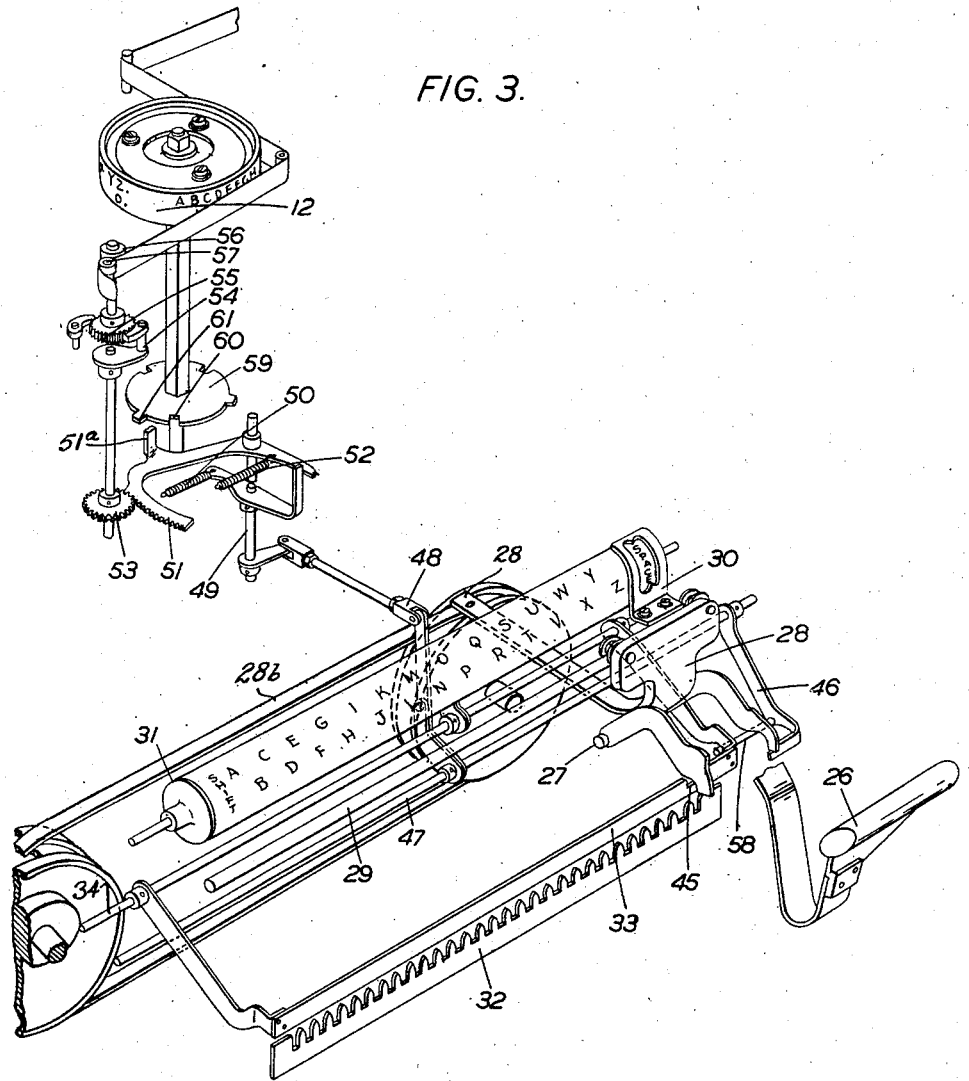
Figure 3 shows by a similar perspective view that part of the mechanism pertaining to the shift of the message tape after a letter or a word has been typed upon it.

Figure 3 is a perspective drawing taken from the same point of view as the other figures and showing the mechanism for feeding the transmitting tape both between letters and between words.

Considering first of all the spacing between the words one sees that for this purpose the handle 26 is moved to its extreme right-hand end where its depression will not affect the printing bail. This time, however, the handle engages a lever 46 which is fixed upon a transverse horizontal shaft 47 thus rotatable clockwise through a linkage 48. The clockwise rotation of the shaft 47 is transmitted to a vertical spindle 49 which is thus turned clockwise against the action of spring 50. The sector bar 51 follows this clockwise movement, being acted upon by the spring 52. The pinion 53 is rotated anti-clockwise and with it the pawl 54 clicks over a number of teeth on the ratchet 55. When the handle 26 is released the parts restore under the action of spring 50 and the ratchet 55 is rotated in a clockwise direction taking with it the feed roll 56 against which the tape is pressed by the pressure roll 57.

The spacing operation is very similar when it is a matter of spacing between letters. In this case the depression of the handle 26 is effective upon the bail 33, while the bail 33 acts upon lever 46 through the coupling rod 58 which is attached to the member 46 and extends under a portion of the bail 33.

The mechanism whereby the amount of feed is proportioned to the width of individual letters will now be described. It is well known that in an ordinary typewriter all the letters occupy the same space even though one letter such as the letter M is wide and another such as the letter I is narrow. While this is of little consequence with ordinary typewritten matter it is undesirable to have such a disproportion between different parts of the text when this text is to be scanned for transmission by facsimile telegraphy. The blank spaces on either side of the letter I, for instance, would represent so much waste of scanning time. Accordingly, the present invention provides for a variable amount of feed according to the width of the letter. This function is brought about by controlling the extent to which the pawl 54 clicks over the ratchet 55 in the anti-clockwise direction. A disc 59 is fixed on the vertical spindle which carries the typewheel 12 and is engageable on its periphery by a lug 51a on the sector 51 to limit the clockwise movement thereof in response to a depression of the handle 26. The periphery is cut away in varying amounts according to the widths of the characters which appear in the corresponding angular position of the typewheel. Thus for a letter M there would be a deep notch as indicated at 60, while for the letter I there would be a projection as indicated at 61. The excess movement of the handle and its associated parts is, of course, taken up by the spring 52.

Figure 4:
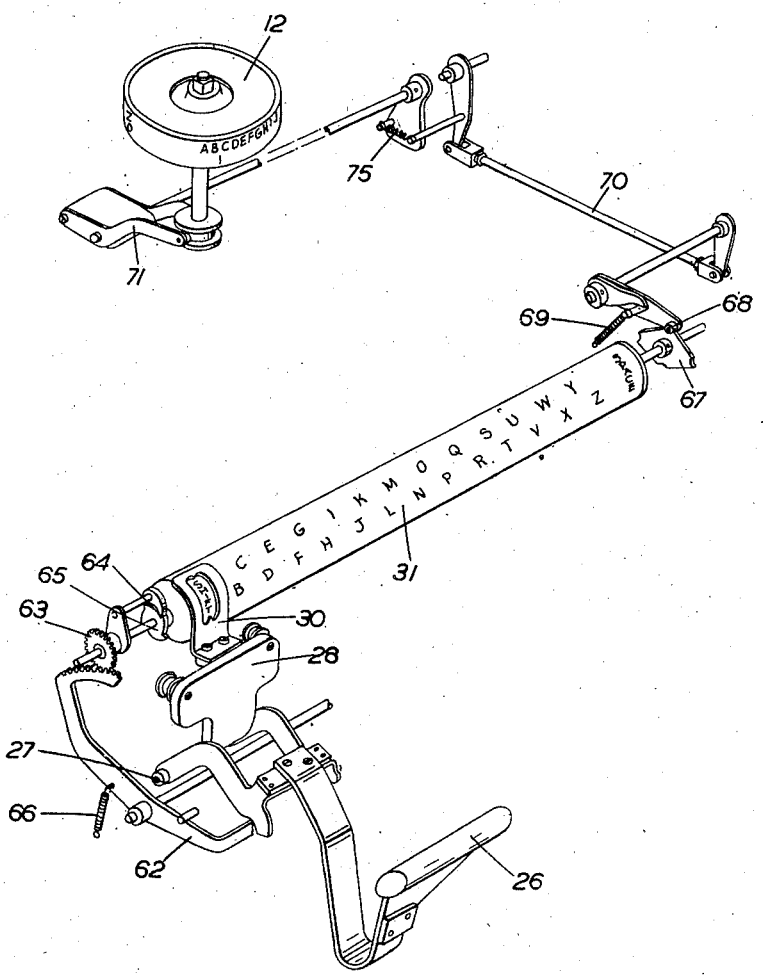
Figure 4 shows in yet another perspective view the mechanism pertaining to the shift of the type-wheel between its letter and numeral positions.

Figure 4 shows the mechanism for shifting the type-wheel between its upper and lower positions corresponding to letters and numerals. To effect such a change the operator must move the handle to the extreme left-hand end where it is out of engagement with the bail 33 but instead engages a lever 62 which is rotated clockwise upon depression of the handle. At its rear end the lever 62 carries a segmental rack which is in permanent engagement with a pinion 63 with which rotates a pawl 64, the depression of the handle causing the pawl to click over its associated ratchet 65 in the anti-clockwise direction. Upon release of the handle the return spring 66 causes a clockwise movement of the pinion 63, pawl 64 and ratchet 65, the last-named taking with it the roller 31 which causes a visible display of the complete alphabet or numerals. The roller 31 carries two sets of letters and two sets of numerals, one set in each quadrant. At the right-hand end of the roller 31 is a cam 67 on the periphery of which rides the cam follower 68, the shape of the cam being such that the pressure of the follower due to its spring 69 will bring the roller exactly into one of its four angular positions. An inspection of the shape of the cam 67 will show that the follower 68 can assume either an upper or lower position, this positioning of the follower being transmitted through linkage 70 to the back of the machine where it causes a lever 71 to hold the typewheel 12 either up or down.

It is of some importance that the upper and lower positions of the type-wheel should be determined precisely. For this purpose there are provided upper and lower abutments 72 and 73 (see Figure 5) against which the type-wheel is held by spring pressure. For engagement against the lower abutment 73 this pressure is provided by the spring 74 and it is evident that the cam 67 and its follower 68 must be so proportioned as to afford an excess movement so as not to inhibit the positioning action. The pressure for engagement with the upper abutment 72 is provided by the spring 75 in Figure 4 which forms part of the linkage 70, and again there must be some additional lift on the follower D in order that this spring 75 may be stressed. Of course the spring 75 must be stronger than the spring 74.

Figure 5:
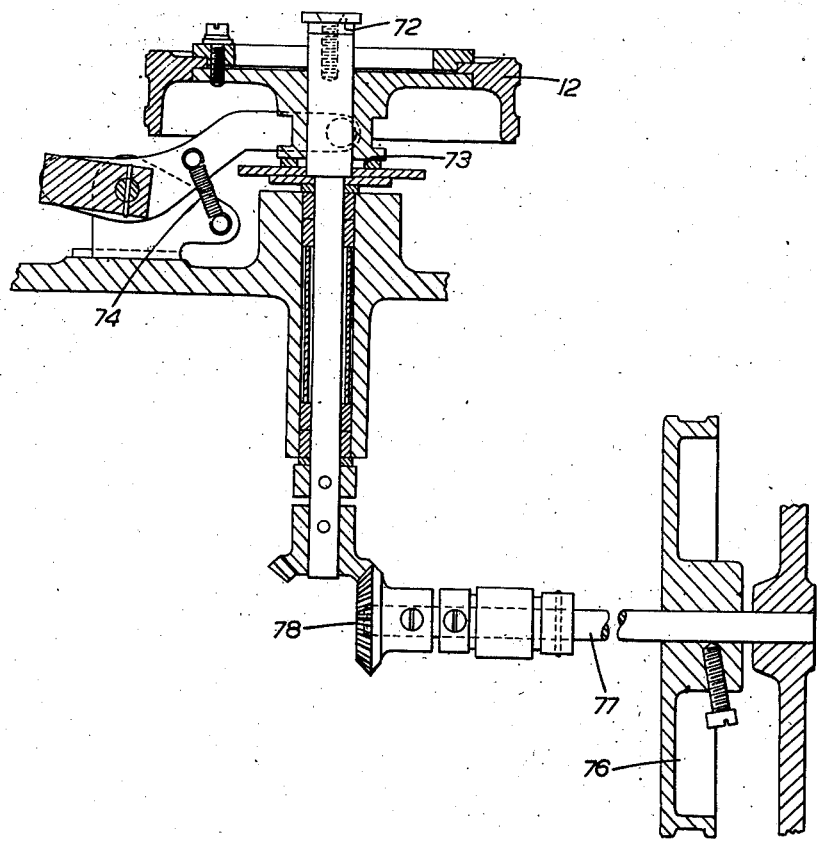
Figure 5 shows by a vertical transverse section the mechanism for rotating the type-wheel to select individual characters on its periphery.

Considering now the means by which the transverse movement of the handle 26 serves to select some one character on the typewheel, reference may be made to Figs. 3 and 5. An extension 28a from the rear of the carriage 28 is clamped onto an endless band 28b passing round two wheels of which one is shown enlarged at 76 in Figure 5. One of these wheels is connected through a horizontal shaft 77 and bevel gearing 78 to the vertical shaft carrying the type-wheel 12. Thus transverse movements of the handle cause rotation of the mechanism in a self-evident manner.

Figure 6:
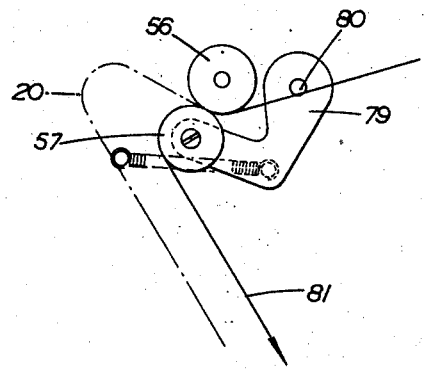
Figure 6 shows in plan the arrangement of the intermittent feed rolls for the transmitting tape so that this feed can be relieved when there is no more slack between the intermittent feed position and the continuous feed position.

It was mentioned previously that the transmitting tape must have two motions, one intermittent as it passes the type-wheel and the other continuous as it passes the scanning aperture. This presents no difficulty if there is a loop as at 20 in Figure 1 but this loop will be taken up completely when the operator has finished all typing and wishes to transmit the last few inches of tape which lie between the type-wheel 12 and the scanning position 15. To take care of this it is provided that the intermittent feed shall be taken off when the tape becomes taut. In Figure 6 are shown the intermittent feed roller 56 and associated pressure roller 57 which have already been described with reference to Figure 3. The feed roller 56 has a fixed mounting but the pressure roller 57 is mounted upon an arm 79 and is spring-urged in a clockwise direction about the pivot 80 of the arm 79. So long as there is a loop 20 the two rollers are in firm engagement, gripping between them the transmitting tape; but when the tape is drawn taut by the scanning feed rollers and the pressure roller 57 is pulled as indicated at 81 so that it is disengaged from the feed roller 56 and the tape can be drawn off its spool 11 in a continuous manner. It will be appreciated that the axes of the rollers and of the pivot 80 must be positioned appropriately for the pull in the direction 81 to be effective.

What is claimed is:

1. In facsimile transmitting apparatus a type unit including a plurality of characters, an index member carrying said characters arranged in series, an indicator movable along the index member, means for selecting said characters in accordance with characters on the index member in register with the indicator, means for printing a selected character in one predetermined position, means including a common manually operated member for actuating both the indicator and the printing means, means for driving a recording tape, including means for intermittently driving said tape past said predetermined position in accordance with the manual operation of said common member, and means for continuously driving said tape past another predetermined position at a speed substantially independent of that at said one predetermined position.

2. Facsimile transmitting apparatus as set forth in claim 1, including means for moving the indicator along the index member when the manually operated member is moved along one path and means for actuating the printing means when said member is moved in a direction at an angle to said path.

3. Facsimile transmitting apparatus as set forth in claim 1, in which the manually operated member is moved along a predetermined path for moving the indicator and the type unit is movable into a plurality of positions each corresponding to a different set of characters and which also includes means actuated by movement of the manually operated member at an angle to said path and at a predetermined point in said path for shifting the position of the type unit.

4. Facsimile transmitting apparatus as set forth in claim 1, including tape feeding means actuated by said manually operated member.

5. Facsimile transmitting apparatus as set forth in claim 1, including tape feeding means actuated by said manually operated member, said feeding means including means for varying the feed in accordance with variations in width of the selected characters.

6. Facsimile transmitting apparatus as set forth in claim 1, including means actuated by the manually operated member for feeding the tape between characters to provide spaces between successive message units such as words.

7. In a writing machine, a manually operated device for recording a message on the tape, comprising a type unit including a plurality of characters arranged in sets; character selecting means including a shiftable index member on which the characters of each set are longitudinally arranged in sequence and the sets are transversely spaced, an indicator longitudinally movable in register with the characters on the index member, and means actuated by the indicator for selecting the type unit character corresponding to the registering character on said index member; and means for shifting the index member to bring another set of characters into register with the indicator and also shifting the type unit to bring the corresponding set of characters thereon into printing position.

8. A writing machine as set forth in claim 7, in which the index member has an axially symmetrical index surface and is rotatable about its axis to bring the sets of characters selectively into register with the indicator.

9. A writing machine as set forth in claim 7, in which the index member has an axially symmetrical index surface and is rotatable to bring different sets of characters selectively into register with the indicator, the means for shifting the type unit including a member actuated by rotation of the index member.

10. A writing machine as set forth in claim 7, in which the type unit is a type wheel provided with axially spaced sets of characters and the shifting means is effective to shift said type wheel in an axial direction.

11. In a writing machine, means for printing successive characters on the tape including a type wheel having a fixed axis, and means for bringing the tape against the wheel at a printing station to print a selected character thereon; and means for intermittently feeding the tape to said station by increments of varying widths corresponding to the widths of the characters printed thereon, including a feed drive ratchet, an associated drive pawl, and means for shifting the pawl along the ratchet including a movable actuating member, an adjustable stop for said member, means for shifting said stop in accordance with the rotary movement of the type wheel into positions corresponding to the widths of the selected characters, and means for shifting said member from a rest position into engagement with said stop and then back to rest position, thereby shifting the ratchet and tape through a selected distance in synchronism with said printing means.

12. A writing machine as set forth in claim 11, in which the means for shifting the actuating member includes a drive member having a fixed movement and a connected member having a yielding connection to the drive member.

13. In facsimile transmitting apparatus in which messages printed on a tape are reproduced as line signals, a printing device, a scanning device, means for driving the tape intermittently to the printing device past one predetermined position, means independent of said last mentioned means for driving the printed tape continuously to the scanning device past another predetermined position, and means intermediate said predetermined positions actuated by the tape when subjected to tension by the continuous driving means for releasing the engagement of the intermittent driving means with the tape, whereby tape rupture is avoided in the absence of slack tape between said driving means.

14. Facsimile transmitting apparatus as set forth in claim 13, in which the intermittent tape driving means includes a roller yieldably pressed against the tape, and the continuous driving means is laterally offset from the plane of movement of the tape in the driving zone, being located at the same side of said plane as said roller, the arrangement being such that tension on the tape exerted the continuous driving means is operative to shift said roller laterally out of driving position.

15. Facsimile transmitting apparatus as set forth in claim 13, in which the intermittent tape driving means includes a pair of opposed rollers, one of said rollers being an idler yieldably mounted for movement away from the other roller, the tape when tensioned extending partly around said idler roller and thence to the continuous driving means.

ALFRED EDWARD THOMPSON.
REGINALD DENNIS SALMON.